(12) United States Patent
Perry

(10) Patent No.: US 11,680,674 B2
(45) Date of Patent: Jun. 20, 2023

(54) INSULATING JACKET FOR PIPE FITTINGS

(71) Applicant: Ken Perry, Markham (CA)

(72) Inventor: Ken Perry, Markham (CA)

( * ) Notice: Subject to any disclaimer, the term of this patent is extended or adjusted under 35 U.S.C. 154(b) by 468 days.

(21) Appl. No.: 16/171,580

(22) Filed: Oct. 26, 2018

(65) Prior Publication Data

US 2020/0166174 A1 May 28, 2020

(51) Int. Cl.
*F16L 59/22* (2006.01)
*F16L 59/18* (2006.01)

(52) U.S. Cl.
CPC ............. *F16L 59/22* (2013.01); *F16L 59/182* (2013.01)

(58) Field of Classification Search
CPC ....... F16L 59/22; F16L 59/182; F16L 59/103; F16L 59/106; F16L 59/11; F16L 59/10; F16L 2201/80; F16L 9/00; F16L 9/14
USPC .................................. 285/15–17, 47–48, 50
See application file for complete search history.

(56) References Cited

U.S. PATENT DOCUMENTS

| | | | | |
|---|---|---|---|---|
| 1,814,134 A * | 7/1931 | Eige | ........................ | F16L 59/16 138/140 |
| 3,732,894 A * | 5/1973 | Botsolas | .................. | F16L 59/11 285/183 |
| 4,259,981 A * | 4/1981 | Busse | ...................... | F16L 59/22 285/47 |
| 4,461,498 A * | 7/1984 | Kunsman | ................ | F16L 57/06 285/112 |
| 4,553,308 A * | 11/1985 | Botsolas | .................. | F16L 59/22 138/149 |
| 4,733,889 A * | 3/1988 | Haines | ..................... | F16L 57/06 285/16 |
| 4,807,669 A * | 2/1989 | Prestidge, Sr. | ......... | F16L 59/22 138/149 |
| 5,022,685 A * | 6/1991 | Stiskin | ................ | B29C 66/8286 285/45 |
| 5,054,513 A * | 10/1991 | Trueb | ..................... | F16L 59/168 137/375 |
| 5,303,730 A * | 4/1994 | Trueb | ........................ | F16L 9/22 137/375 |
| 5,360,031 A * | 11/1994 | Trueb | ...................... | F16L 59/11 137/375 |
| 5,419,364 A * | 5/1995 | Trueb | ..................... | F16L 59/168 137/375 |
| 5,540,255 A * | 7/1996 | Trueb | ..................... | F16L 59/168 137/375 |

(Continued)

FOREIGN PATENT DOCUMENTS

| | | | | |
|---|---|---|---|---|
| DE | 2544289 A1 * | 4/1976 | ............. | F16L 59/22 |
| GB | 2494454 A * | 3/2013 | ............. | F16L 59/22 |
| WO | WO-9710464 A1 * | 3/1997 | ............. | F16L 59/22 |

*Primary Examiner* — Matthew Troutman
*Assistant Examiner* — Fannie C Kee

(57) ABSTRACT

An insulating jacket for enclosing a pipe fitting includes an elbow housing configured to envelop and cover a pipe elbow and a pair of coupling housings each configured to envelop couplings mounted to the elbow. Each of the housings is made from a pair of housing halves which are made from a block of rigid insulating material. Each pair of housing halves can be mated together by interlocking tongue in groove connection elements formed on the housing halves. The rigid insulating material is soft enough to be carved by hand and resilient enough to be deform sufficiently to allow the housing halves to be mated over the pipe fitting.

20 Claims, 4 Drawing Sheets

(56) References Cited

U.S. PATENT DOCUMENTS

| | | | |
|---|---|---|---|
| 6,450,551 B1* | 9/2002 | Lee | F16L 17/04 |
| | | | 285/373 |
| 7,100,633 B2* | 9/2006 | Lechuga | E03C 1/32 |
| | | | 137/375 |
| 8,820,795 B2* | 9/2014 | Dole | F16L 41/021 |
| | | | 285/179 |
| 9,476,538 B2* | 10/2016 | Kim | F16L 59/22 |
| 2013/0071593 A1* | 3/2013 | MacNeill | F16L 59/22 |
| | | | 428/36.5 |

* cited by examiner

INSULATING JACKET FOR PIPE FITTINGS

CROSS-REFERENCE TO RELATED APPLICATION

This application claims priority from U.S. Provisional Application 62/577,968 filed Oct. 27, 2017 which is incorporated herein by reference.

BACKGROUND

The present disclosure relates to insulating pipes and in particular to insulating pipe fittings having elbow joints, T joints, Y joints and the like.

Pipes often require insulating to prevent the pipe from exchanging heat with the surrounding environment. Pipe insulation usually consists of elongated tubular blankets or housings made of an insulating material such as elastic polymeric foam, cellulose or the like. These blankets and housings are usually configured such that they can be opened lengthwise and then closed around a section of pipe to enclose and envelop the pipe. While unbroken straight or curved sections of pipe can easily be insulated using preformed elongated blankets or housings, pipe fittings consisting of a curved section of pipe (hereafter called an elbow) which is joined to lengths of pipe by couplings poses technical problems. The elongated blankets and tubular housings intended for insulating the pipe cannot contain the pipe fitting as the cross sectional diameter of the pipe fitting is generally much greater than the cross sectional diameter of the rest of the pipe. To ensure that the pipe fitting is insulated, the person insulating the pipe is usually reduced to wrapping the entire fitting, elbow and couplings included, with strips of flexible insulation and then securing the strips in place using duct tape or the like. Since the strips of flexible insulation may not be sufficient to wrap the entire fitting, multiple strips may have to be wrapped around the fitting and secured in place with duct tape. The entire wrapped fitting is then wrapped with a more water resistant wrapping material such as duct tape to protect the insulation surrounding the fitting. This process of hand wrapping the fitting with strips of insulation not only takes a long time and a lot of effort, the end result is often unsightly and not very weather resistant.

Plastic preformed shells dimensioned to fit over the pipe fitting have been introduced to the market to lend a more weather resistant and neater looking cover over the wrapped pipe fitting. Each of these shells generally consist of a pair of thin walled plastic shell halves dimensioned to fit over the entire fitting including the couplings. Once placed over the coupling, the shell halves can be secured to each other in place by wrapping the shell with duct tape or the like. While the use of these thin walled shells adds additional weather resistance, they too are laborious to use and only offer limited weather resistance.

SUMMARY

In accordance with one aspect of the present invention, there is provided an insulating jacket for covering a pipe fitting wherein the pipe fitting includes an elbow extending between a pair of first and second couplings with the elbow and couplings having an outer surface. The insulating jacket consists of an elbow housing and a first and second coupling housing which are respectively configured to envelope the elbow and the first and second couplings of the pipe fitting. Each of these housings has an outer surface surrounding an insulating mantle. The mantle of each of these respective housings has a void configured to completely envelop the elbow and first and second couplings. The elbow housing and first and second coupling housings are each formed as pairs of first and second halve portions configured to mate together along a peripheral edge formed on each of said paired first and second halve portions. Each of said pairs of halve portions of the elbow housing and first and second coupling housings have a concave surface configured to conform approximately to the outer surface of the elbow and first and second couplings, respectively. The elbow housing has opposite first and second ends configured to mate to the first and second coupling housings, respectively.

In accordance with another aspect of the present invention, herein is disclosed an insulating jacket for covering a pipe fitting, the pipe fitting having an elbow extending between a pair of first and second couplings, the elbow and pair of couplings having outside surfaces. The insulating jacket includes an elbow housing having an outer surface surrounding an insulating mantle. The insulating mantle is dimensioned and configured to conform to the outside surface of the elbow so as to permit the elbow housing to completely envelop the elbow and cover over the entire outside surface of the elbow which extends between the pair of couplings. The elbow housing is formed as first and second portions which are configured to mate together along a peripheral edge formed on each of the first and second portions. The first and second portions have first and second concave surfaces formed in their respective mantles, the first and second portions dimensioned and configured such that when they are mated together the first and second concave surfaces form a void dimensioned and configured to conform approximately to the outside surface of the elbow. The mantle is made of an insulating material which is sufficiently soft and resilient such that when the first and second concave surfaces are positioned over the elbow and the first and second portions are urged together, the mantle will deform sufficiently to permit the first and second portions to be mated to each other along their peripheral edges.

DETAILED DESCRIPTION

Figure 1:
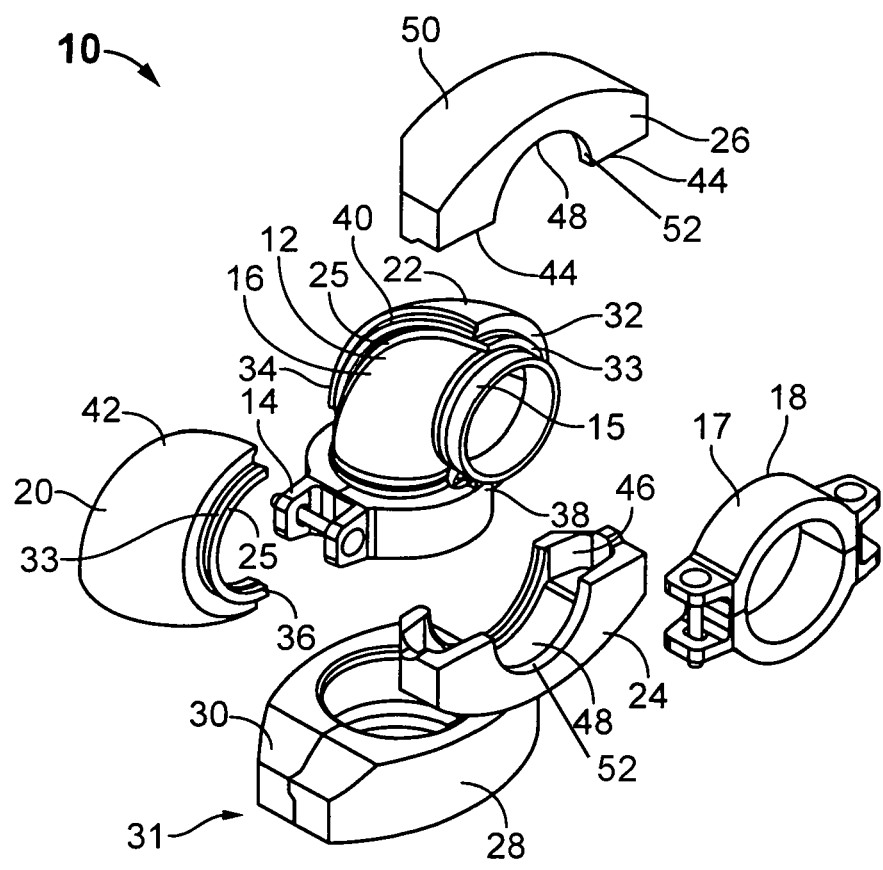
FIG. 1 is an exploded view of the insulating jacket made in accordance with one aspect of the present invention showing one of the couplings coupled to the elbow and one of the elbow housing halves covering half of an elbow portion of a pipe fitting.
Figure 2:
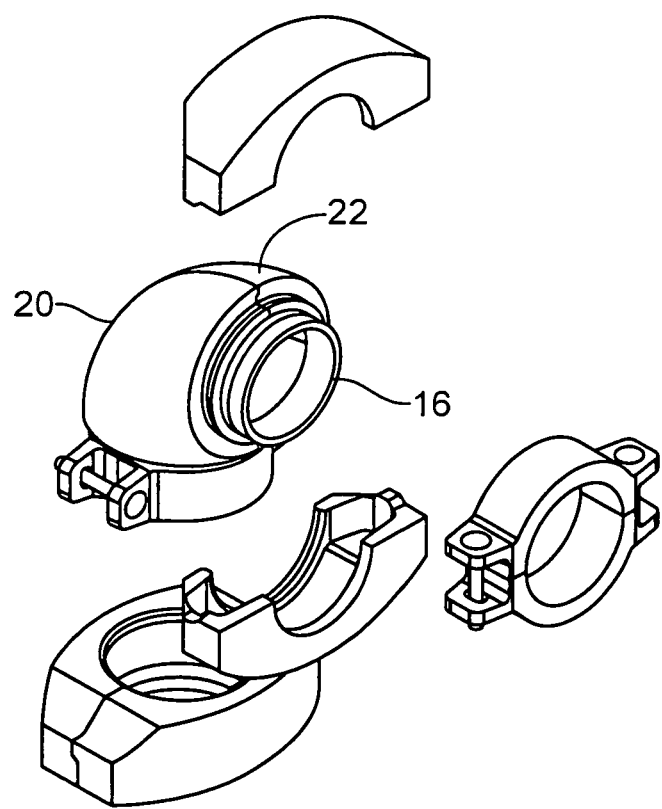
FIG. 2 is an exploded view of the invention shown in FIG. 1 and showing both halves of the elbow housing halves covering the elbow.

Referring firstly to FIG. 1, the insulating jacket of the present invention, shown generally as item 10 consists of a series of blocks made of rigid insulating material which are dimensioned and configured to cover over and enclose pipe fitting 12. Pipe fitting 12 includes an elbow 16 mounted between first coupling 18 and second coupling 14. Elbow 16 is illustrated as a 90° angle elbow, but it will be appreciated that the current invention can be applied to any angle of elbow including a 45° elbow or even a T-connector or Y-connector. Jacket 10 includes separate insulating housings for each of the component parts of the pipe fitting including elbow 16 and couplings 14 and 18. The elbow housing consists of two half portions 20 and 22 which are made of a rigid insulating material such as Styrofoam or fiber glass. Half portions 20 and 22 each have a concave surface 25 which is dimensioned and configured to conform approximately to the outer surface 15 of elbow 16. Half portions 20 and 22 are provided with elongated edges 42 and 40, respectively, which are configured such that half portions 20 and 22 can be mated together along their respective elongated edges by urging the two half portions together. Elongated edges 42 and 40 may be provided with complimentary tongue in groove connector elements to permit the two half portions to be more securely mated together. An additional tongue 36 can be provided on half portion 20 to mate with a corresponding groove 38 formed on half portion 22. Each of the tongue in groove connections are preferably dimensioned and configured to be close fitting to permit the two halves of the elbow housing to be mated securely together. Elongated edges 42 and 40 extend lengthwise along the full length of the elbow coupling between ends 32 and 34. When portions 20 and 22 are mated together, concave surfaces 25 define a void which is dimensioned and configured to enclose and envelop elbow 16 as better seen in FIG. 2.

Figure 3:
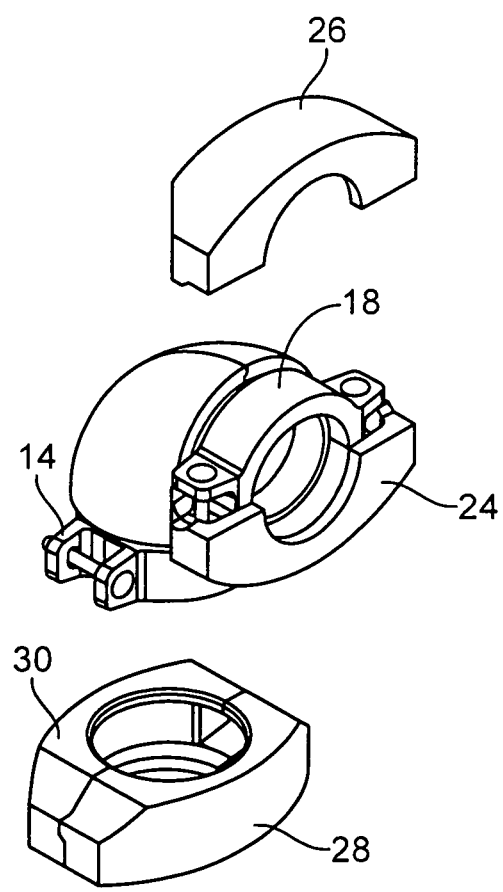
FIG. 3 is an exploded view of the invention shown in FIG. 1 and showing one of the first coupling housing halves covering half of the first coupling of the pipe fitting.
Figure 4:
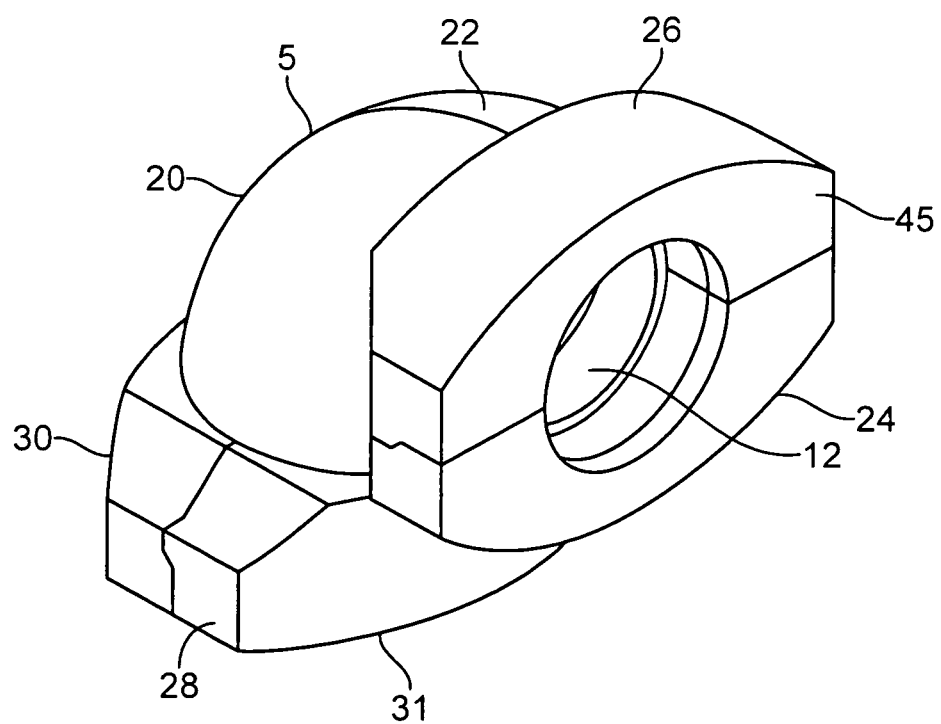
FIG. 4 is an isometric view of the invention shown in FIG. 1 showing the elbow housing and the first and second coupling housings enclosing the entire pipe fitting.

Again referring to FIG. 1, the insulating jacket also includes a first coupling housing consisting of two first coupling housing halves 24 and 26 which are dimensioned and configured to cover over and envelop coupling 18. As with the elbow housing, coupling housing halves 24 and 26 are made of a rigid insulating material such as Styrofoam or fiberglass. First coupling housing halves 24 and 26 have edges 46 and 44, respectively, to permit the halves to be mated to each other. Edges 46 and 44 are provided with corresponding tongue in groove connector elements so that the two edges mate together permitting a relatively secure connection between halves 24 and 26. Halves 24 and 26 both have concave surfaces 48 which are dimensioned and configured to conform approximately to outside surface 17 of coupling 18 such that when halves 24 and 26 are mated together the concave surfaces form a void shaped to envelop and contain coupling 18 as shown in FIGS. 3 and 4. As best seen in FIG. 3, coupling housing halves 24 and 26 are dimensioned to permit the coupling housing to be mounted to the coupling by attaching one coupling housing half at a time.

Referring back to FIG. 1, second coupling 14 is substantially identical to first coupling 18 so a second coupling housing 31 can be provided which is substantially identical to the coupling housing formed from halves 24 and 26. Hence, half portions 28 and 30 are substantially identical to halves 24 and 26 and are made of the same insulating material.

As best seen in FIG. 1, elbow housing halves 20 and 22 are each provided with tongues 33 which extend from the opposite ends of the housing halves. Tongues 33 are dimensioned and configured to mate to coupling housing halves 24, 26, 28 and 30 to ensure a close fit between the elbow housing and the coupling housings and to ensure the entire elbow is enclosed in the jacket. Each of the housings have an outer surface and a mantle. These features will be described by reference to coupling halves 24 and 26. Outer surface 50 is preferably a relatively smooth waterproof surface surrounding mantle 52. Outer surface 50 is preferably just the outer surface of a block of insulating material which is formed to be smooth and waterproof. If the insulating material is made of a closed cell foam material, than outer surface 50 need only be smooth; however, if a porous or open celled insulating material is used, then outer surface 50 may be a separate rigid shell.

As best seen in FIG. 4, when all of the housing halves are mated to each other, pipe fitting 12 is fully enveloped by the jacket. Tongue in groove connectors formed at the edges of halves 20-22, 24-26, and 28-30 and between elbow housing 5 and coupling housings 31 and 45 ensure that the housing halves are mated relatively securely to each other. The housing halves can be secured more firmly together by the use of adhesives or short strips of duct tape.

The insulating material forming housing halves 20, 22, 24, 26, 28 and 30 can be selected from any relatively rigid insulating material such as expanded polystyrene, expanded polyurethane, fiber glass (glass wool), mineral wool, cellulose, flexible elastomeric foam, or virtually any other insulating material which can be formed into relatively rigid blocks. The insulating material used is selected to be sufficiently soft and resilient such that in the event there are inconsistencies between the dimensions of the voids formed by the housing halves and the outer surfaces of the elbow and couplings, the insulation material adjacent the concave surfaces of the housing halves can deform to accommodate the elbow/coupling and allow the housing halves to be mated together. Furthermore, the insulation material is preferably soft enough to allow the user to sculpt the concave surfaces of the housing halves by hand in the event that the fit between the housings and the elbow/couplings does not allow the housing halves to be mated over the elbow or coupling. Materials such as Styrofoam (expanded polystyrene) can easily be sculpted by hand using a knife or simply using bare hands. This allows the fit of the insulating jacket to be quickly customized to the pipe fitting without the need for power tools.

An advantage of the insulating jacket of the present invention is that it permits a user to quickly insulate a pipe fitting with a minimum of effort. The final result is a pipe fitting which is completely insulated and which has a neat and professional appearance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. An insulating jacket for covering a pipe fitting, the pipe fitting having an elbow extending between a pair of first and second couplings, the elbow and the pair of couplings having outer surfaces, the insulating jacket comprising:
  a. an elbow housing comprising an insulating material dimensioned and configured to conform to the outer surface of the elbow so as to permit the elbow housing to envelop the elbow, the elbow housing having a length selected to extend between the pair of couplings and cover over the entire outer surface of the elbow between the pair of couplings;
  b. the elbow housing divided along a length into first and second portions which are configured to mate together along elongated edges formed on each of the first and second portions, the first and second portions having first and second concave surfaces, the first and second portions dimensioned and configured such that when the first and second portions are mated together the first and second concave surfaces form a void dimensioned and configured to conform approximately to the outer surface of the elbow;

c. the insulating material is selected such that when the first and second concave surfaces are positioned over the elbow and the first and second portions are urged together, the insulating material at the first and second concave surfaces will deform against the outer surface of the elbow to permit the first and second portions to be mated to each other along the elongated edges;

d. a first coupling housing comprising the insulating material, the first coupling housing dimensioned and configured to conform to the outer surface of the first coupling of the pair of couplings so as to completely envelop the first coupling, the first coupling housing divided into first and second portions which are configured to mate together along an edge formed on each of the first and second portions of the first coupling housing, said first and second portions having first and second concave surfaces, the first and second portions of the first coupling housing dimensioned and configured such that when the first and second portions of the first coupling housing are mated together the first and second concave surfaces form a void dimensioned and configured to conform approximately to the outer surface of the first coupling; and wherein the elbow housing has opposite first and second ends, with a first tongue and groove connector element configured to conform to the outer surface of the elbow formed on the first end of the elbow housing, and the first coupling housing has first and second ends, with a second tongue and groove connector element configured to conform to the outer surface of the first coupling formed on the first end of the first coupling housing, wherein the first tongue and groove connector element is configured to connect to the second tongue and groove connector element when the elbow housing and the first coupling housing are mated together.

2. The insulating jacket of claim 1 wherein the insulating material is malleable so that the first and second concaves surfaces are configured to conform the first and second concaves surfaces to the outer surface of the elbow and the outer surface of the first coupling.

3. The insulating jacket of claim 2 wherein the insulating material is selected from the group of materials comprising flexible elastomeric foam, expanded polystyrene, expanded polyurethane, polyethylene foam, glass wool, cellulose insulation, and mineral wool.

4. The insulating jacket of claim 3 wherein the insulating jacket comprises an outer surface that is a shell made of a rigid material.

5. The insulating jacket of claim 1 further comprising a second coupling housing comprising the insulating material, the second coupling housing dimensioned and configured to conform to the outer surface of the second coupling of the pair of couplings so as to completely envelop the second coupling, the second coupling housing divided into first and second portions which are configured to mate together along an edge formed on each of the first and second portions of the second coupling housing, said first and second portions of the second coupling housing having first and second concave surfaces, respectively, the first and second portions of the second coupling housing dimensioned and configured such that when the first and second portions of the second coupling housing are mated together the first and second concave surfaces form a void dimensioned and configured to conform approximately to the outer surface of the second coupling.

6. The insulating jacket of claim 5 wherein the elbow housing has a second tongue and groove connector element formed on said second end, the elbow housing and the second coupling housing dimensioned and configured such that the second coupling housing receives the second tongue and groove connector element of the elbow housing.

7. The insulating jacket of claim 6 wherein the insulating material is Styrofoam.

8. The insulating jacket of claim 6 wherein the first and second coupling housings each comprise an outer surface formed as a rigid shell.

9. The insulating jacket of claim 5 wherein the edges of the first and second portions of the second coupling housing have complementary connector elements configured to form a tongue in groove connection when the first and second portions of the second coupling housing are mated together.

10. The insulating jacket of claim 1 wherein the elongated edges of the first and second portions of the elbow housing have complementary connector elements configured to form a tongue in groove connection when the first and second portions of the elbow housing are mated together.

11. The insulating jacket of claim 1 wherein the edges of the first and second portions of the first coupling housing have complementary connector elements configured to form a tongue in groove connection when the first and second portions of the first coupling housing are mated together.

12. An insulating jacket for covering a pipe fitting, the pipe fitting having an elbow extending between a pair of first and second couplings, the elbow and pair of couplings having outer surfaces, the insulating jacket comprising:

a. an elbow housing and a first and second coupling housing for enveloping the elbow and the first and second couplings of the pipe fitting, respectively, each of said housings having an outer surface surrounding an insulating mantle, the insulating mantle of the elbow housing and the first and second coupling housings having a void dimensioned and configured to completely envelop the elbow and first and second couplings, respectively;

b. the elbow housing and first and second coupling housings each formed as pairs of first and second halved portions configured to mate together along a peripheral edge formed on each of said pairs of first and second halved portions, each of said pairs of halved portions of the elbow housing and first and second coupling housings having a concave surface configured to conform approximately to the outer surfaces of the elbow and first and second couplings, respectively;

c. the elbow housing having opposite first and second ends configured to engage the first and second coupling housings, respectively; and wherein the opposite first and second ends of the elbow housing are each provided with a tongue configured to conform approximately to the outer surface of the elbow, the first and second coupling housings being configured to engage the tongues on the first and second ends of the elbow housing, respectively, when the first and second coupling housings are mated together with the elbow housing.

13. The insulating jacket of claim 12 wherein the insulating mantle of each of the elbow housing and the first and second coupling housings is made of an insulating material which is configured to conform to the outer surfaces of the elbow and first and second couplings of the pipe fitting.

14. The insulating jacket of claim 13 wherein the insulating mantle of each of the elbow housing and first and second coupling housings is made of an insulating material selected from the group of materials comprising flexible elastomeric foam, expanded polystyrene, expanded polyurethane, polyethylene foam, glass wool, cellulose insulation, and mineral wool.

15. The insulating jacket of claim 14 wherein the outer surface of each of the elbow housing and first and second coupling housings is made of a rigid waterproof material.

16. The insulating jacket of claim 13 wherein the peripheral edges formed on each of the paired first and second halved portions of the elbow housing and first and second coupling housings are configured to mate together by tongue and groove connections.

17. An insulating jacket for covering a pipe fitting, the pipe fitting having first and second couplings located at either end of a body of the pipe fitting:
 a. a tubular housing comprising an insulating material dimensioned and configured to conform to an outer surface of the body so as to permit the tubular housing to envelop the body between the first and second couplings and substantially cover over the entire outer surface of the body between the first and second couplings;
 b. the tubular housing divided along a length into first and second portions which are configured to mate together along elongated edges formed on each of the first and second portions of the tubular housing, the first and second portions of the tubular housing having first and second concave surfaces, the first and second portions dimensioned and configured such that when the first and second portions of the tubular housing are mated together the first and second concave surfaces form a void dimensioned and configured to conform approximately to the outer surface of the body;
 c. the insulating material is selected such that when the first and second concave surfaces are positioned over the body and the first and second portions of the tubular housing are urged together, the insulating material at the first and second concave surfaces will deform against the outer surface of the body to permit the first and second portions of the tubular housing to be mated to each other along the elongated edges;
 d. at least one coupling housing comprising the insulating material, the at least one coupling housing dimensioned and configured to conform to an outer surface of the first or second coupling so as to completely envelop the first or second coupling, the at least one coupling housing divided into first and second portions which are configured to mate together along an edge formed on each of the first and second portions of the at least one coupling housing, said first and second portions of the at least one coupling housing having first and second concave surfaces, the first and second portions of the at least one coupling housing dimensioned and configured such that when the first and second portions of the at least one coupling housing are mated together, the first and second concave surfaces form a void dimensioned and configured to conform approximately to the outer surface of the first or second coupling;
 wherein the at least one coupling housing is mounted to the tubular housing by way of a tongue and groove formed on the at least one coupling housing and the tubular housing, and the tongue and groove are dimensioned and configured to conform approximately to the outer surface of at least one of the first or second coupling and the outer surface of the body.

18. The insulating jacket of claim 17 wherein the at least one coupling housing comprises an insulating material selected from the group of materials comprising flexible elastomeric foam, expanded polystyrene, expanded polyurethane, polyethylene foam, glass wool, cellulose insulation, and mineral wool.

19. An insulating jacket for covering a pipe fitting, the pipe fitting having first and second end couplings located at either end of a body of the pipe fitting:
 a. a tubular housing comprising an insulating material dimensioned and configured to conform to an outer surface of the body so as to permit the tubular housing to envelop the body between the first and second end couplings and substantially cover over the entire outer surface of the body between the first and second end couplings;
 b. the tubular housing divided along a length into first and second portions which are configured to mate together along elongated edges formed on each of the first and second portions, the first and second portions of the tubular housing having first and second concave surfaces, the first and second portions of the tubular housing dimensioned and configured such that when the first and second portions of the tubular housing are mated together the first and second concave surfaces form a void dimensioned and configured to conform approximately to the outer surface of the body;
 c. the insulating material is selected such that when the first and second concave surfaces are positioned over the body and the first and second portions are urged together, the insulating material at the first and second concave surfaces will deform against the outer surface of the body to permit the first and second portions of the tubular housing to be mated to each other along the elongated edges;
 d. at least one coupling housing comprising the insulating material, the at least one coupling housing dimensioned and configured to conform to an outer surface of the first end coupling so as to completely envelop the first end coupling, the at least one coupling housing divided into first and second portions which are configured to mate together along an edge formed on each of the first and second portions of the at least one coupling housing, said first and second portions of the at least one coupling housing having first and second concave surfaces, the first and second portions of the at least one coupling housing dimensioned and configured such that when the first and second portions of the at least one coupling housing are mated together the first and second concave surfaces form a void dimensioned and configured to conform approximately to the outer surface of the first end coupling;
 wherein the at least one coupling housing is mountable to the tubular housing by first attaching the first portion of the at least one coupling housing and then the second portion of the at least one coupling housing to the tubular housing proximate the first end coupling, the at least one coupling housing being mounted to the tubular housing by way of a tongue and groove connection formed on the at least-eft one coupling housing and the tubular housing, wherein the tongue and groove connection is dimensioned and configured to conform approximately to the outer surface of the first end coupling and the outer surface of the body.

20. The insulating jacket of claim 19 wherein the tubular housing and the at least one coupling housing comprise an insulating material selected from the group of materials comprising flexible elastomeric foam, expanded polystyrene, expanded polyurethane, polyethylene foam, glass wool, cellulose insulation, and mineral wool.

* * * * *

UNITED STATES PATENT AND TRADEMARK OFFICE
CERTIFICATE OF CORRECTION

PATENT NO. : 11,680,674 B2
APPLICATION NO. : 16/171580
DATED : June 20, 2023
INVENTOR(S) : Ken Perry It is certified that error appears in the above-identified patent and that said Letters Patent is hereby corrected as shown below:

In the Claims

Column 8:
Claim 19, Line 63, "formed on the at least-eft one coupling housing and the" should read ---formed on the at least one coupling housing and the---.

Signed and Sealed this
Twelfth Day of March, 2024

Katherine Kelly Vidal
*Director of the United States Patent and Trademark Office*